United States Patent [19]

Harrison, Jr.

[11] Patent Number: 5,337,411

[45] Date of Patent: Aug. 9, 1994

[54] MULTI-PROCESSOR COMPUTER SYSTEM BUS ARCHITECTURE

[75] Inventor: Earnest R. Harrison, Jr., Severna Park, Md.

[73] Assignee: Westinghouse Electric Corporation, Pittsburgh, Pa.

[21] Appl. No.: 703,586

[22] Filed: May 20, 1991

Related U.S. Application Data

[63] Continuation of Ser. No. 260,146, Oct. 20, 1988, abandoned.

[51] Int. Cl.[5] .............................................. G06F 15/16
[52] U.S. Cl. ..................................... 395/200; 395/800; 364/228.3; 364/228.9; 364/229.0; 364/DIG. 1
[58] Field of Search ... 364/200 MS File, 900 MS File; 395/200, 800; 307/412, 304, 317.1; 375/7

[56] References Cited

U.S. PATENT DOCUMENTS

| | | | |
|---|---|---|---|
| 3,952,304 | 4/1976 | Broniwitz et al. | 342/95 |
| 4,228,496 | 10/1980 | Katzman et al. | 395/200 |
| 4,315,321 | 2/1982 | Parks, III et al. | 395/500 |
| 4,322,794 | 3/1982 | Kurakake | 395/275 |
| 4,466,062 | 8/1984 | Krikor | 395/200 |
| 4,468,750 | 8/1984 | Chamoff et al. | 395/275 |
| 4,503,535 | 3/1985 | Budde et al. | 395/800 |
| 4,527,237 | 6/1985 | Frieder et al. | 395/200 |
| 4,663,706 | 5/1987 | Allen et al. | 395/200 |
| 4,672,535 | 6/1987 | Katzman et al. | 395/275 |
| 4,750,177 | 6/1988 | Hendric et al. | 395/725 |
| 4,777,591 | 10/1988 | Chang et al. | 395/800 |
| 4,785,453 | 11/1988 | Chandran et al. | 371/51.1 |
| 4,811,210 | 3/1989 | McAulay | 395/325 |
| 4,926,418 | 5/1990 | Cidon et al. | 370/85.5 |
| 4,945,479 | 6/1990 | Rusterholz et al. | 395/800 |
| 5,005,174 | 4/1991 | Bruckert et al. | 395/575 |

OTHER PUBLICATIONS

Signetics, High-Speed CMOS Data Manual, 1986, pp. 7-315 to 7-319.
Principles of CMOS VLSI Design: A System Perspective, N. H. E. Weste and K. Eshraghian, 1985, pp. 224-229.
Texas Instruments, TTL Data Book: vol. 2, 1985 pp. 3-826 to 3-828.

Primary Examiner—Parshotam S. Lall
Assistant Examiner—William M. Treat

[57] ABSTRACT

A bus structure for a real-time multiprocessor computing system connects, for example, 16 processors, each having only two bus interfaces, without degrading processor performance or requiring partitioning by application programmers. The processors are divided into groups with each combination of two groups connected together and to memory and peripheral units via a different bus. In a computing system having first, second, third and fourth processor groups and first and second memory groups and peripheral groups, a first bus connects the first and second processor groups together and to first groups of memory and peripheral units, a second bus connects the first and fourth processors together and to second memory and peripheral groups, a third bus connects the second and third processors to the second memory and peripheral groups and a fourth bus connects the third and fourth processor groups to the first memory and peripheral groups.

5 Claims, 2 Drawing Sheets

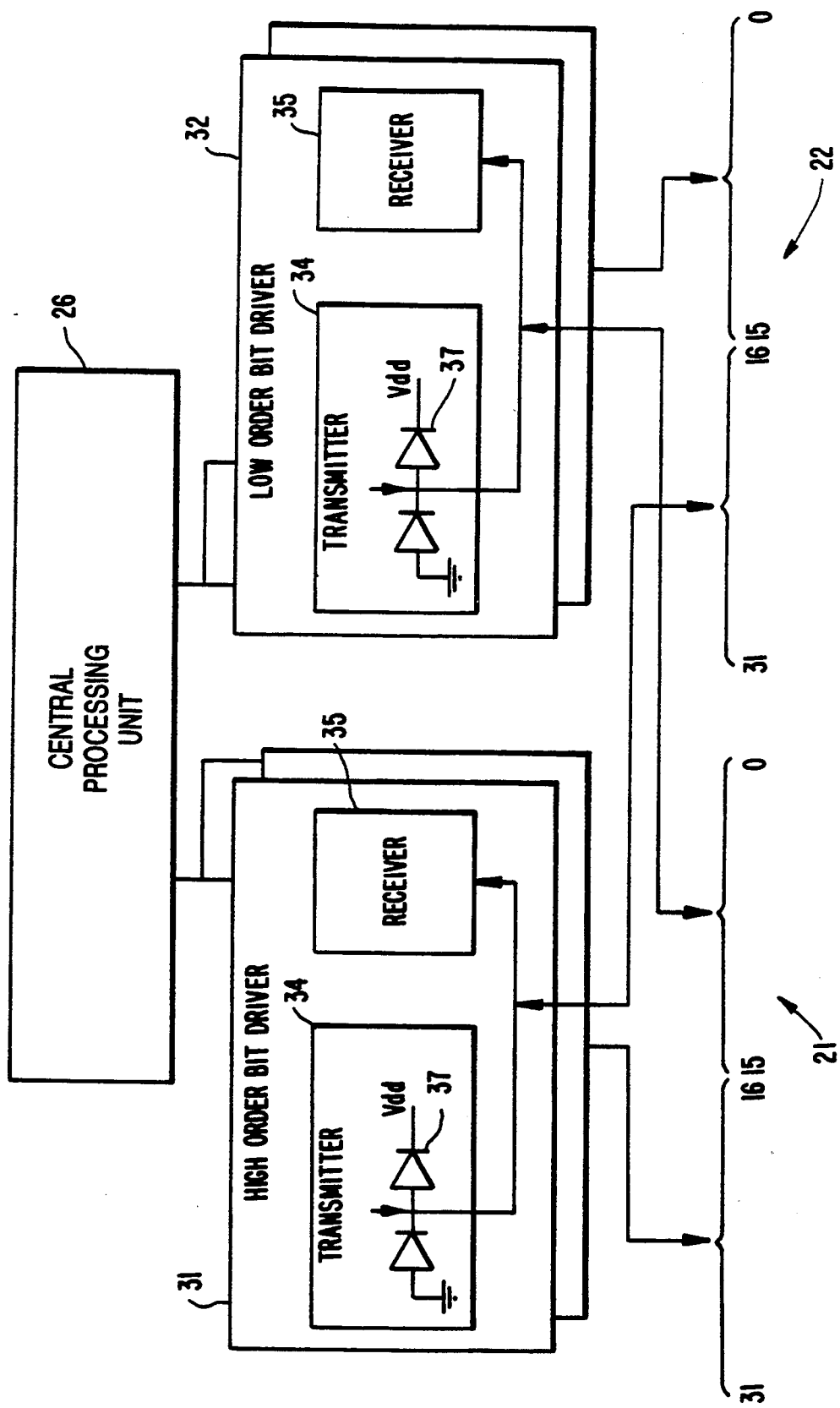

MULTI-PROCESSOR COMPUTER SYSTEM BUS ARCHITECTURE

This application is a continuation of application Ser. No. 07/260,146 filed Oct. 20, 1988 now abandoned.

BACKGROUND OF THE INVENTION

1. Field of the Invention

The present invention is related to bus architecture of computer systems, and more particularly, to a bus architecture for a multiprocessor computer system.

2. Description of the Related Art

A common technique for increasing computing power in a computer system is to increase the number of processors in the system. Multidrop, bus-oriented networks for connecting multiple processors are generally less complex and more easily adapted to existing software than point-to-point systems which require a significant investment in low level software designed for the specific network. Known bus architectures of this type include Multibus II from INTEL CORP., Futurebus from the IEEE P896.1 working group, PI Bus from the Pave Pillar initiative, Fastbus from the USNIM Committe of the DOE, VME from Motorola, and NU-BUS from Texas Instruments. However, these and other known multiprocessor bus architectures have several limitations on the number of processors which can be connected together.

When some or all of the memory in the computer system is shared, the processors are considered "tightly coupled" and programming the computer system can be simplified. However, tight coupling requires a large bandwidth between the processors and the memories to be effective. Typically, three or four processors can share memory in this fashion to triple or quadruple the processing power of the computer system. However, as a fifth or sixth processor is added to the system, there are increasingly smaller additions to computing power because the processors spend too much of their time waiting for access to the bus. In addition, increasing the number of processors and other units in the computer system increase the electrical load on the bus, further limiting performance.

Some of the multiprocessor bus architectures include two buses, primarily to provide redundancy. Other bus architectures group the processors in clusters using a hierarchy of buses. However, the number of processors at the lowest hierarchy level is still limited to approximately four for maximum efficiency.

Increasing the number of buses results in an increased number of connections to each circuit card, requiring that each card has a minimum size to provide room for the necessary connections. If the number of bits transmitted on each bus is reduced, the number of buses can be increased without affecting the physical size limitation; however, the bandwidth of each bus is reduced.

SUMMARY OF THE INVENTION

An object of the present invention is to provide a multi-drop bus architecture permitting up to 16 processors to efficiently run in a computer system, with only two bus interfaces for each processor.

Another object of the present inventions is to provide a multidrop bus architecture which completely uses multiple buses during error free operation and provides fault tolerance to continue operation upon failure of one of the buses.

Yet another object of the present invention is to provide a bus architecture capable of operating at a higher synchronous clock rate than a single bus architecture.

The above objects are attained by providing a bus structure for a multiprocessor computing system including a plurality of processor groups, each processor group including at least one processor, a plurality of memory groups each memory group including at least one memory unit, a plurality of input/output interfaces and a plurality of buses, each pair of the processor groups connected together and to one of the memory groups and one of the input/output interfaces via one of the buses.

A preferred system includes first, second, third and fourth groups of processors, first and second groups of memory units and first and second groups of peripheral units. A first bus is operatively connected to the first and second groups of processors and the first groups of memory units and peripheral units. A second bus is operatively connected to the first and fourth groups of processors and the second groups of memory and peripheral units. A third bus is operatively connected to the second and third groups of processors and the second groups of memory and peripheral units. A fourth bus is operatively connected to the third and fourth groups of processors and the first groups of memory and peripheral units.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

BRIEF DESCRIPTION OF THE DRAWINGS

FIG. 2 is a block diagram of a processor card illustrating bus driver circuits.

DESCRIPTION OF THE PREFERRED EMBODIMENT

Figure 1:
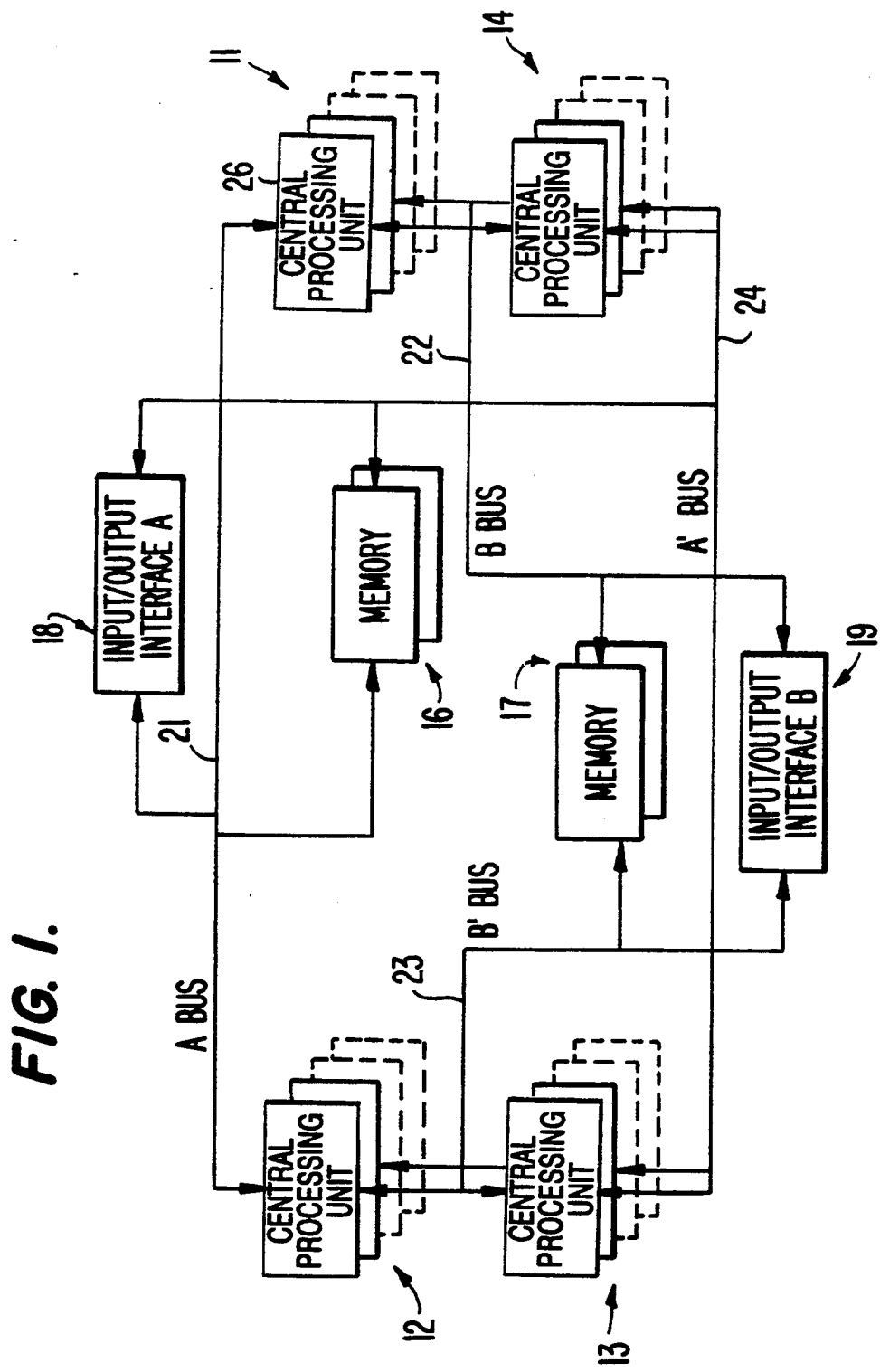
FIG. 1 is a block diagram of a computing system having a bus architecture according to the present invention.

In applications requiring large amounts of real-time processing power, such as air traffic control radar, up to 16 processors may be needed. As described above, this is more than twice as many processors as can typically be handled by a single bus, multidrop computing system.

An embodiment of the present invention is illustrated in FIG. 1. Up to 16 processors can be connected as illustrated in FIG. 1 with little degradation in processor performance due to waiting for access to a bus.

In FIG. 1, CPU groups 11-14 are connected to memory groups 16 and 17 and peripheral groups In FIG. 1, the peripheral groups 18-19 each consists of a single input/output interface, but more input/output interfaces or other types of peripheral units might also be included. Each of the processor and memory groups includes at least one processor and memory unit, respectively. In the embodiment illustrated in FIG. 1, there are two memory units in each of the memory groups 16 and 17 and two to four processors in the processor groups 11-14. The processors, memory units and input/output interfaces are connected via four buses with only two buses connected to each of the units. A first bus 21 connects first and second processor groups 11-12 together and to first groups of memory units 16 and peripheral units 18. A second bus 22 connects the first processor group 11 and processor group 14 to the second groups of memory units 17 and peripheral unit(s) 19.

The first groups of memory units 16 and peripheral unit(s) 18 are respectively referred to as memory A and input/output interface A, while the second groups of memory units 17 and peripheral unit(s) 19 are respectively referred to as memory B and input/output interface B. The buses connecting the first CPU 11 to the first and second groups of memory units and peripheral units are respectively referred to as the A bus and the B bus. Similarly, the second group of processor units 12 and third group of processor units 13 are connected via a bus 23 to the second groups of memory units 17 and peripheral unit(s) 19, while the third and fourth groups of processor units 13-14 are connected to the first groups of memory units 16 and peripheral unit(s) 18 via a bus 24. The buses 23 and 24 are respectively referred to as the B' bus and the A' bus since they too are connected to the B units and A units, respectively.

Thus, each processor group is connected to two buses, each of which it shares with a different processor group and each of which is connected to different groups of memory units and peripheral unit(s). Provided the work performed by each of the processor groups is evenly distributed over the two buses connected thereto, each bus will carry approximately half the traffic produced by a maximum of eight processors, or the equivalent of all the traffic produced by four processors. As a result, in an evenly balanced computing system, the computing system illustrated in FIG. 1 with 16 processors will have close to 16 times the processing power of a single one of the processors used in the system. The operating system used to run a computing system according to the present invention determines the degree to which processing is evenly distributed over the buses and to the processors. One operating system which has been found to provide satisfactory distribution of processing without requiring application programmers to specify specific processors for execution is MTOS from Industrial Products Incorporated of Jericho, N.Y.

The computing system illustrated in FIG. 1 is designed for use in processing radar signals. Therefore, the processors all have a single clock frequency and the buses 21-24 all operate synchronously at the single clock frequency. This reduces noise problems in the processing of the radar signals. As the clock frequency of microprocessors increases, it is desirable to have a physical bus structure and bus interface which can operate at the higher clock frequencies in order to make use of newer microprocessors. The bus architecture of the present invention enables the buses to operate at 20 MHz using conventional epoxy-glass circuit boards for the back-plane and up to 35 or 40 MHz using TEFLON-loaded circuit boards having a lower dielectric constant.

These speeds are accomplished by using the bus interface structure illustrated in FIG. 2. As an example, the bus interface circuit for one of the processors 26 in processor group 11 is illustrated in FIG. 2. The bus interface circuit comprises high order bit drivers 31 and low order bit drivers 32 for driving and receiving high and low order bits, respectively, transmitted via the two buses 21 and 22 connected to the first processor group 11. The high and low order bit drivers 31 and 32 are preferably separate integrated circuits such as complementary metal insulator semiconductor chips. The use of two chips provides for better heat dissipation and the use of CMIS (typically CMOS) chips provides for higher speed and lower power usage. Each chip may contain two transmitters 34 and two receivers 35 since only one of the four circuits on such a chip is used at any given time.

The high and low order bit drivers are essentially identical, differing only in their connection to the buses 21 and 22, as illustrated in FIG. 2. Each bit driver preferably provides series termination of the buses, as opposed to parallel or shunt termination. The impedance used for series termination of the buses are preferably included in the output impedance of the drivers. The use of series termination reduces the size of the termination resistors to enable the resistors to be included in the integrated chip, reduces the power requirement and increases the speed with which the bus settles. Inherent substrate diodes 37 in the transmitter driver circuits 34 dampen excessive voltage received by the corresponding receiver circuit 35.

In addition to providing communication between a larger number of processors than any other multidrop bus architecture which does not require partitioning of tasks by application programmers, the bus structure of the present invention also provides fault tolerance. If one of the buses, e.g., the A bus 21 fails, the first and second processor groups 11 and 12 can still access memory group 17 and input/output interface group 19 via the B and B' buses 22 and 23. The processors in the processor groups 11 and 12 can then be assigned tasks which use input/output interface B 19 or can operate on data stored in memory group 17 by processors in processor groups 13 and 14. Even if another bus, such as the B bus 22 fails, all that will be lost is the processors in processor group 11 since the processors in processor group 13 are still connected to both input/output interfaces 18 and 19 can pass data to the processors in processor groups 12 and 14 via the memories or buses which are shared by these processor groups and processor group 13. Thus, failures in the computing system illustrated in FIG. 1 result in reduced performance, rather than total failure of the system. This is an important feature of computing systems used for air traffic control radar.

The many features and advantages of the present invention are apparent from the detailed specification and thus, it is intended by the appended claims to cover all such features and advantages of the apparatus which fall within the true spirit and scope of the invention. Further, since numerous modifications and changes will readily occur to those skilled in the art, it is not desired to limit the invention to the exact construction and operation illustrated and described. For example, the invention is not limited to four buses and four processor groups, but may be used with other numbers of processor groups and buses, including hierarchal bus structures and systems with processors connected to more than two buses, each of which is connected to different memory and peripheral unit groups. Accordingly, all suitable modifications and equivalents may be resorted to falling within the scopes and spirit of the invention.

What is claimed is:

1. A bus structure for a multiprocessor computing system including first, second, third and fourth groups of processors, each group including at least one processor, first and second groups of memory units, each group including at least one memory unit and first and second groups of peripheral units, each group including at least one peripheral unit, said bus structure comprising:
- a first bus, connected to the first and second groups of processors and the first group of memory units and peripheral units, for providing direct communication therebetween;
- a second bus, connected to the first and fourth groups of processors and the second group of memory units and peripheral units, for providing direct communication therebetween;
- a third bus, connected to the second and third groups of processors and the second group of memory units and peripheral units, for providing direct communication therebetween;
- a fourth bus, connected to the third and fourth groups of processors and the first group of memory units and peripheral units, for providing direct communication therebetween;
- bus interface circuits connected between the processors and said first, second, third and fourth buses, each bus interface circuit including a high order bit circuit for driving and receiving high order bits transmitted via two of said buses connected thereto, and a low order bit circuit for driving and receiving low order bits transmitted via two of said buses connected thereto; and
- wherein said high and low order bit circuits in said bus interface circuits each includes a receiver circuit, connected to a corresponding processor and one of the two of said buses, for receiving bits on the one of the two of said buses, and a driver circuit, connected to the corresponding processor and the one of the two of said buses for transmitting bits on the one of the two of said buses, said driver circuit including substrate diodes, connected to said receiver circuit, for dampening excessive voltage received by said receiver circuit.

2. A bus structure as recited in claim 1, wherein the processors all have a single clock frequency, and
- wherein said first, second, third and fourth buses all operate synchronously at the single clock frequency.

3. A bus structure as recited in claim 1, wherein said high and low order bit circuits are constructued as separate integrated circuits.

4. A bus structure as recited in claim 1, wherein said first and second, third and fourth buses provide tightly coupled communication between the groups of processors operatively connected thereto.

5. A bus structure for a multiprocessor computing system including first, second, third and fourth groups of processors, each group including at least one processor, first and second groups of memory units, each group including at least one memory unit, and first and second groups of peripheral units, each group including at least one peripheral unit, said bus structure comprising:
- bus interface circuits, each connected to one of the processors and including
  - a receiver circuit, connected to a corresponding processor, for receiving bits; and
  - a driver circuit, connected to the corresponding processor, for transmitting bits, said driver circuit including substrate diodes, connected to said receiver circuit, for dampening excessive voltage received by said receiver circuit;
- a first bus, directly connected to said bus interface circuits for the first and second groups of processors and to the first groups of memory units and peripheral units, for providing communication therebetween;
- a second bus, directly connected to said bus interface circuits for the first and fourth groups of processors and to the second groups of memory units and peripheral units, for providing communication therebetween;
- a third bus, directly connected to said bus interface circuits for the second and third groups of processors and to the second groups of memory units and peripheral units, for providing communication therebetween; and
- a fourth bus, directly connected to said bus interface circuits for the third and fourth groups of processors and to the first groups of memory units and peripheral units, for providing communication therebetween.

* * * * *